(12) United States Patent
Holsman et al.

(10) Patent No.: US 8,712,999 B2
(45) Date of Patent: Apr. 29, 2014

(54) SYSTEMS AND METHODS FOR ONLINE SEARCH RECIRCULATION AND QUERY CATEGORIZATION

(75) Inventors: Ian Holsman, Victoria (AU); Vaijanath N. Rao, Karnataka (IN)

(73) Assignee: AOL Inc., Dulles, VA (US)

( * ) Notice: Subject to any disclaimer, the term of this patent is extended or adjusted under 35 U.S.C. 154(b) by 78 days.

(21) Appl. No.: 13/156,724

(22) Filed: Jun. 9, 2011

(65) Prior Publication Data
US 2011/0307462 A1 Dec. 15, 2011

Related U.S. Application Data

(60) Provisional application No. 61/353,534, filed on Jun. 10, 2010.

(51) Int. Cl.
*G06F 17/30* (2006.01)

(52) U.S. Cl.
USPC .......... 707/721; 707/706; 707/707; 707/709; 707/711; 707/712; 707/714; 707/715; 707/716; 707/717; 707/718; 707/719; 707/722; 707/736; 707/758; 707/787

(58) Field of Classification Search
USPC ......... 707/706, 707, 709, 711, 712, 714–719, 707/721, 722, 736, 758, 787, 707/999.001–999.006
See application file for complete search history.

(56) References Cited

U.S. PATENT DOCUMENTS

| | | | | |
|---|---|---|---|---|
| 6,917,972 | B1 * | 7/2005 | Basko et al. | 709/224 |
| 2008/0010683 | A1 * | 1/2008 | Baddour et al. | 726/24 |
| 2009/0106237 | A1 * | 4/2009 | Holstein et al. | 707/5 |
| 2009/0192986 | A1 * | 7/2009 | Garg et al. | 707/3 |
| 2009/0248494 | A1 * | 10/2009 | Hueter et al. | 705/10 |

FOREIGN PATENT DOCUMENTS

| | | |
|---|---|---|
| EP | 1 431 888 A1 | 6/2004 |
| EP | 1431888 A1 * | 6/2004 |
| WO | WO 2008/000508 A1 | 1/2008 |
| WO | WO 2008/002690 A2 | 1/2008 |

OTHER PUBLICATIONS

European Search Report in Application No. 11004782.6-1527, dated Sep. 7, 2011, 7 pages.

* cited by examiner

*Primary Examiner* — Syling Yen
(74) *Attorney, Agent, or Firm* — Finnegan, Henderson, Farabow, Garrett & Dunner, LLP

(57) ABSTRACT

A computer-implemented method for generating online search results includes receiving, over the Internet, referring URL data including a query, and a network site ID for a network site that was visited based on third party search engine analysis of the query; generating indexed query and network site data based on the received referring URL data and network site; receiving a new query from a user; determining a network site relevant to the new query based on the indexed query and network site data; and displaying to the user a link to the network site. Systems for generating online search results are also disclosed.

24 Claims, 8 Drawing Sheets

SYSTEMS AND METHODS FOR ONLINE SEARCH RECIRCULATION AND QUERY CATEGORIZATION

RELATED APPLICATION(S)

This application claims the benefit of priority of U.S. Provisional Patent Application No. 61/353,534, filed on Jun. 10, 2010. The disclosure of the above-referenced application is expressly incorporated herein in its entirety by reference.

BACKGROUND INFORMATION

1. Technical Field

The present disclosure generally relates to the field of data processing and online search engines. More specifically, and without limitation, the exemplary embodiments described herein relate to systems and methods for online search recirculation and query categorization.

2. Background

Since the early years of the Internet, search engines have been used to navigate through the millions of web pages and content items that make up the Internet. Search engines generally parse or "crawl" textual data, index the textual data, and then search the textual data based upon user requests. Search engines generally include a home page having a "query bar" into which a user may type a keyword query, as well as back-end search engine servers connected to a home page server. Upon receipt of a search query, most search engines conduct a search through stored indexes for web pages that include the query keyword (i.e., so-called "hits"). In addition, search engines often employ complicated ranking and relevancy algorithms to determine which web page results will be most relevant to the query keyword(s) entered by users. Search engines often return search results in a list of hits, including a URL link directing to each website hit, in a sequence based on relevancy.

Web search engines often require substantial resources to crawl the incredibly large volume of text content on web pages of the Internet. For example, search engines require substantial processing power to crawl web pages on a frequent, high-speed, or even real-time basis. Search engines also require substantial physical data storage capacity to store large indexes of web content. Thus, it can be difficult, expensive, and unpractical for some Internet entities to implement extensive, web-crawling-based search engines. Moreover, some search engines employ editors to define relationships between queries, topics, and web pages. However, editorial search engine programming is also very unreliable and time-intensive.

The present disclosure addresses one or more of the above-referenced problems by providing improved systems and methods for online search recirculation and query categorization.

SUMMARY

In accordance with one exemplary embodiment, a computer-implemented method is disclosed for generating online search results. The method includes receiving, over the Internet, referring URL data including a query, and a network site ID for a network site that was visited based on third party search engine analysis of the query; generating indexed query and network site data based on the received referring URL data and network site; receiving a new query from a user; determining a network site relevant to the new query based on the indexed query and network site data; and displaying to the user a link to the network site.

In accordance with one exemplary embodiment, a system is disclosed for generating online search results. The system includes a recirculation engine configured for: receiving, over the Internet, referring URL data including a query, and a network site ID for a network site that was visited based on third party search engine analysis of the query; and generating indexed query and network site data based on the received referring URL data and network site. The system also includes a network search engine configured for: receiving a new query from a user; determining a network site relevant to the new query based on the indexed query and network site data; and displaying to the user a link to the network site.

In accordance with one exemplary embodiment, a computer-implemented method is disclosed for generating online search results using categorizing search queries. The method includes receiving, over the Internet, referring URL data including a query, and a category of a network site that was visited based on third party search engine analysis of the query; generating indexed query and category data based on the received referring URL data and category; receiving a new query from a user; determining a network site category relevant to the new query based on the indexed query and category data; and displaying to the user a link to a network site in the network site category.

In accordance with one exemplary embodiment, a system is disclosed for generating online search results using categorizing search queries. The system includes a categorization engine configured for: receiving, over the Internet, referring URL data including a query, and a category of a network site that was visited based on third party search engine analysis of the query; and generating indexed query and category data based on the received referring URL data and category. The system also includes a network search engine configured for: receiving a new query from a user; determining a network site category relevant to the new query based on the indexed query and category data; and displaying to the user a link to a network site in the network site category.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The following figures are used to describe exemplary features and embodiments related to the present disclosure. In the figures.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Figure 1:
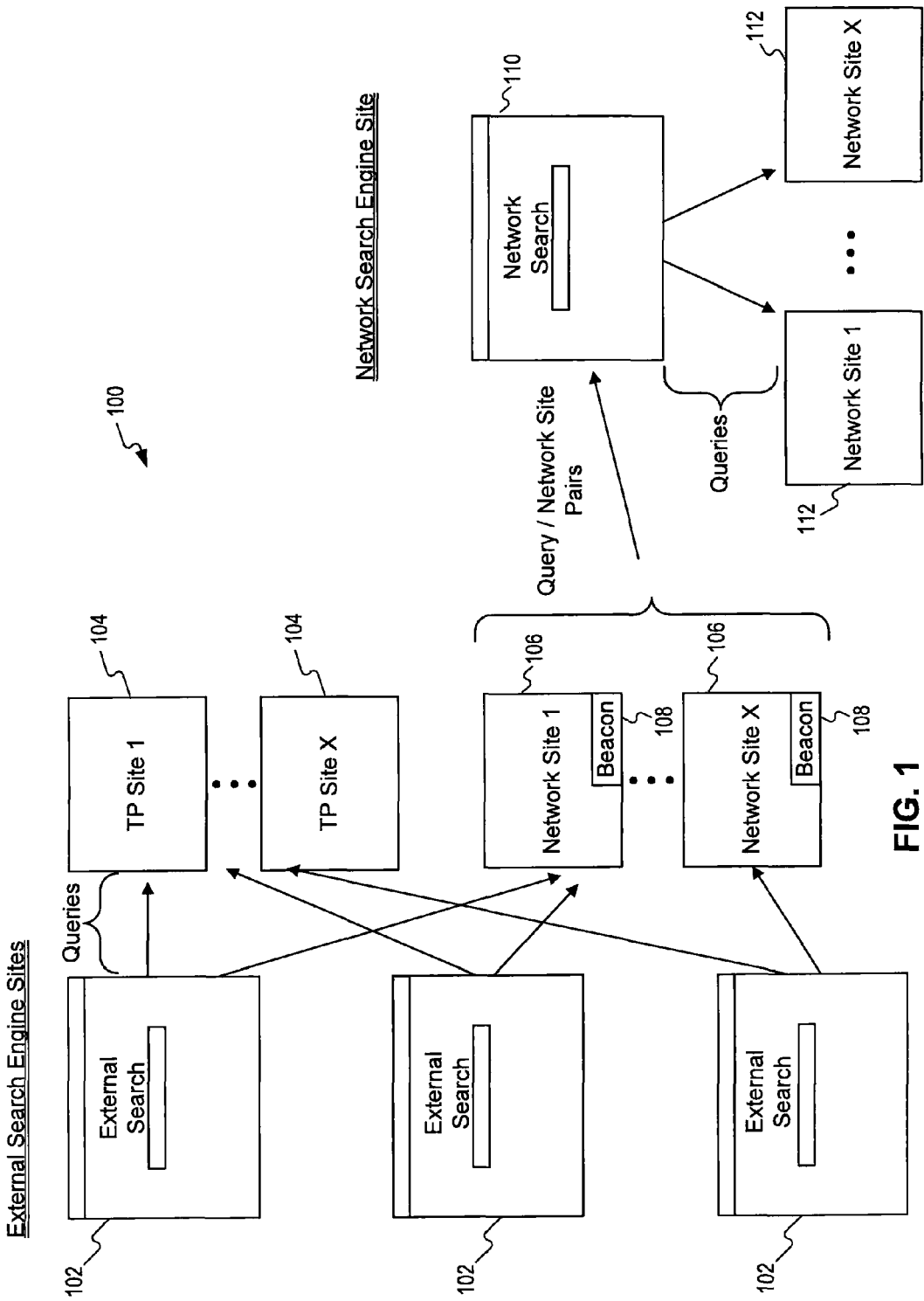
FIG. 1 depicts a block diagram of an exemplary website environment for performing search query recirculation.

FIG. 1 depicts a block diagram of an exemplary website environment 100 and an exemplary flow of information between websites of the Internet. In one embodiment, website environment 100 may include a plurality of external search engine sites 102, third-party websites 104, network websites 106/112, and a network search engine site 110, which are all accessible over the Internet. In one embodiment, network search engine site 110 and network websites 106/112 may be associated with a particular Internet services company operating an online network. For instance, the online network may offer search services and web portal services through the network search engine site 110, while offering categorized online content on one or more of the network websites 106/112, which may be divided by subject-matter.

External search engine sites 102 may be any type of web search engine operating on a website of the Internet, and implementing an algorithmic crawl/index/search scheme for providing keyword search results to users of the Internet. External search engine sites 102 may be configured to receive queries from users, and then direct users to any related third-party websites 104 and/or network sites 106/112 based on the queries. In general, when a user clicks on a "hit," or link to a website suggested as being relevant by a search engine, the search engine may pass along a "referring URL" to the website that is viewed. The referring URL may include embedded information about the domain of the earlier-visited search engine, the query that was typed into the search engine, and the search results that were displayed.

In one embodiment, each network site 106 may be programmed, or otherwise provided, with a tracking beacon 108, which may be a web bug, tracking bug, tracking pixel, pixel tag, or any other type of web object configured to log web data. For instance, the online network may code tracking beacons 108 into network sites 106 to log web data including referring URLs sent by external search engine sites 102. In one embodiment, tracking beacons 108 may be configured to mine referring URL data, and log the queries that were entered by users who ended up viewing the respective network sites. Thus, the online network may use tracking beacons 108 to determine, store, and analyze the queries that are used to reach each particular network site 106, through external search engine sites 102.

The network may therefore generate query/network website pairs, or lists of queries used to reach each network site 106. For instance, the network may generate an entry for each new query used to reach a network site, and then advance a counter for each additional time that query is used to reach the network site. Thus, the network may generate a table, index, or other database that relates queries to network sites, based on the interaction between users and external search engine sites 102.

Network search engine site 110 may then leverage the associations of query/network site information to generate search results and/or improve search results. For instance, when a user enters a keyword query into network search engine site 110, the network may search the database for the query, and then determine the ranking of network sites for which the query was used the most to reach those network sites. The network search engine site 110 may then display a list of hits, or relevant network sites 112 that are most relevant to the requested query, based on the query/network site associations, and ultimately on the algorithms or other methods employed by the external search engines 102.

Figure 2:
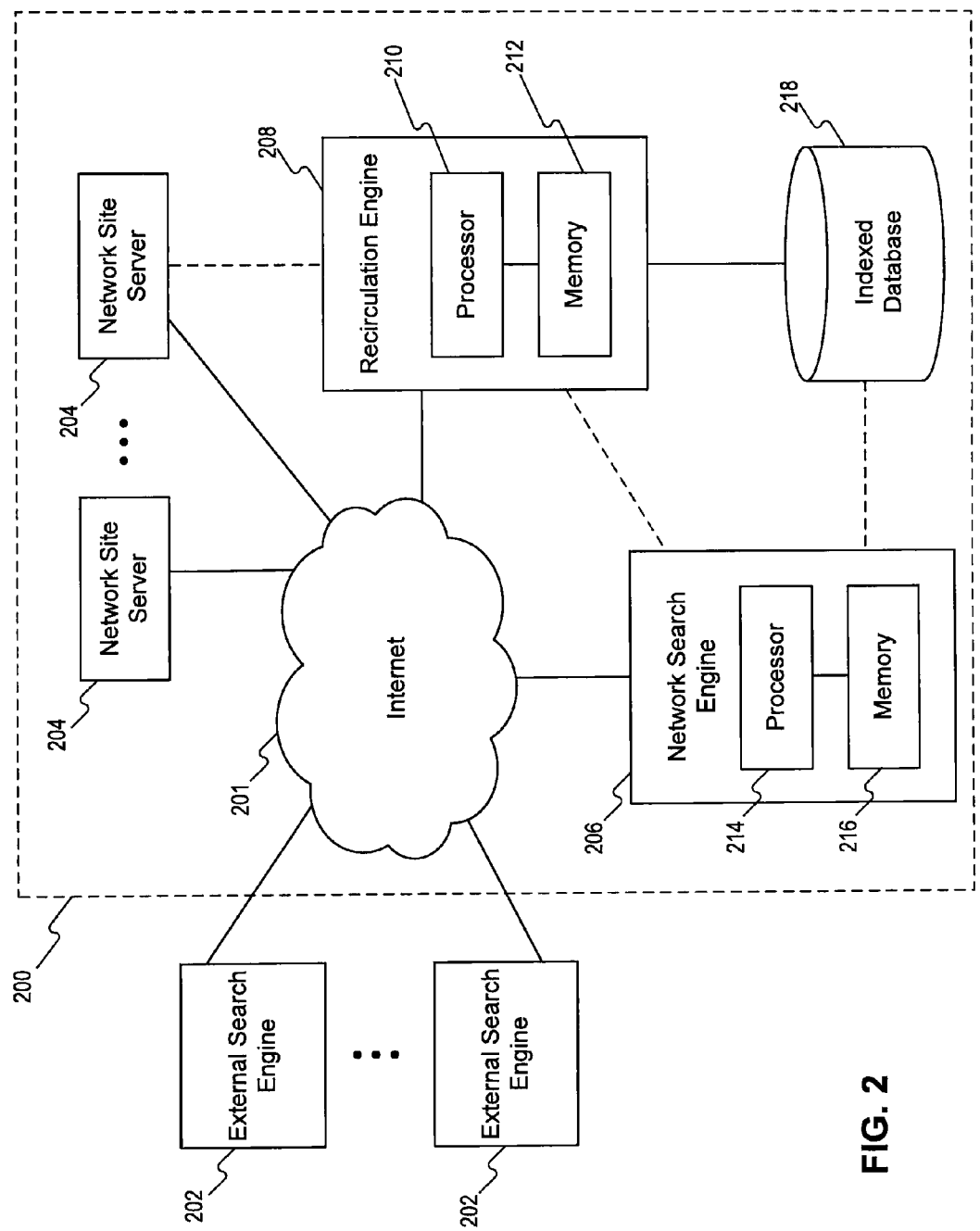
FIG. 2 depicts a block diagram of exemplary online network in which search query recirculation may be performed.

FIG. 2 depicts a block diagram of an exemplary network 200 in which Internet environment 100 may operate. External search engines 202 may be web servers connected to the Internet 201 for running external search engine websites 102. In one embodiment, external search engines 202 may be associated with other Internet companies not associated with online network 200, or the above-described Internet services company. Online network 200 may include network site servers 204, which may be web servers connected to the Internet 201, for running content-categorized network websites 106/112. Online network 200 may also include a recirculation engine 208, which may include a processor 210 and memory 212, which may be a physical data storage device. Recirculation engine 208 may be configured to receive information from network site servers 204, such as beacon data, click data, impression data, referrer logs, referrer URLs, user demographic information, timestamps, etc., either directly or over the Internet. For example, recirculation engine 208 may receive queries embedded in referring URLs obtained by tracking beacons 108. Recirculation engine 208 may also be configured to manage and manipulate data received from network site servers 204. In one embodiment, recirculation engine 208 may be configured to generate tables, indexes, or other databases that relate queries to network sites, based on information received from network site servers 204.

Online network 200 may also include an indexed database 218, which may receive tables, indexes, or other formatted data from recirculation engine 208. Indexed database 218 may include one or more physical storage devices. In one embodiment, recirculation engine 208 and indexed database 218 may be combined, or provided in communication with each other directly or over the Internet. Indexed database 218 may pull information from recirculation engine 208 on-demand, or recirculation engine 208 may periodically push information to indexed database 218.

Online network 200 may also include a network search engine 206, which may include one or more web servers connected to the Internet 201 for running network search engine website 110. Network search engine 206 may include a processor 214 and a memory 216, which may be a physical data storage device. Network search engine 206 may be configured to interact with users over the Internet 201 so as to receive search queries. Network search engine 206 may also be configured to look up queries and related network sites 106, 112 within indexed database 218. For example, network search engine 206 may receive a query, and then search for a subset of network sites that were accessed the most using that query. Network search engine 206 may also communicate with recirculation engine 208, such that network search engine 206 and recirculation engine 208 may exchange information directly instead of over the Internet 201.

Figure 3:
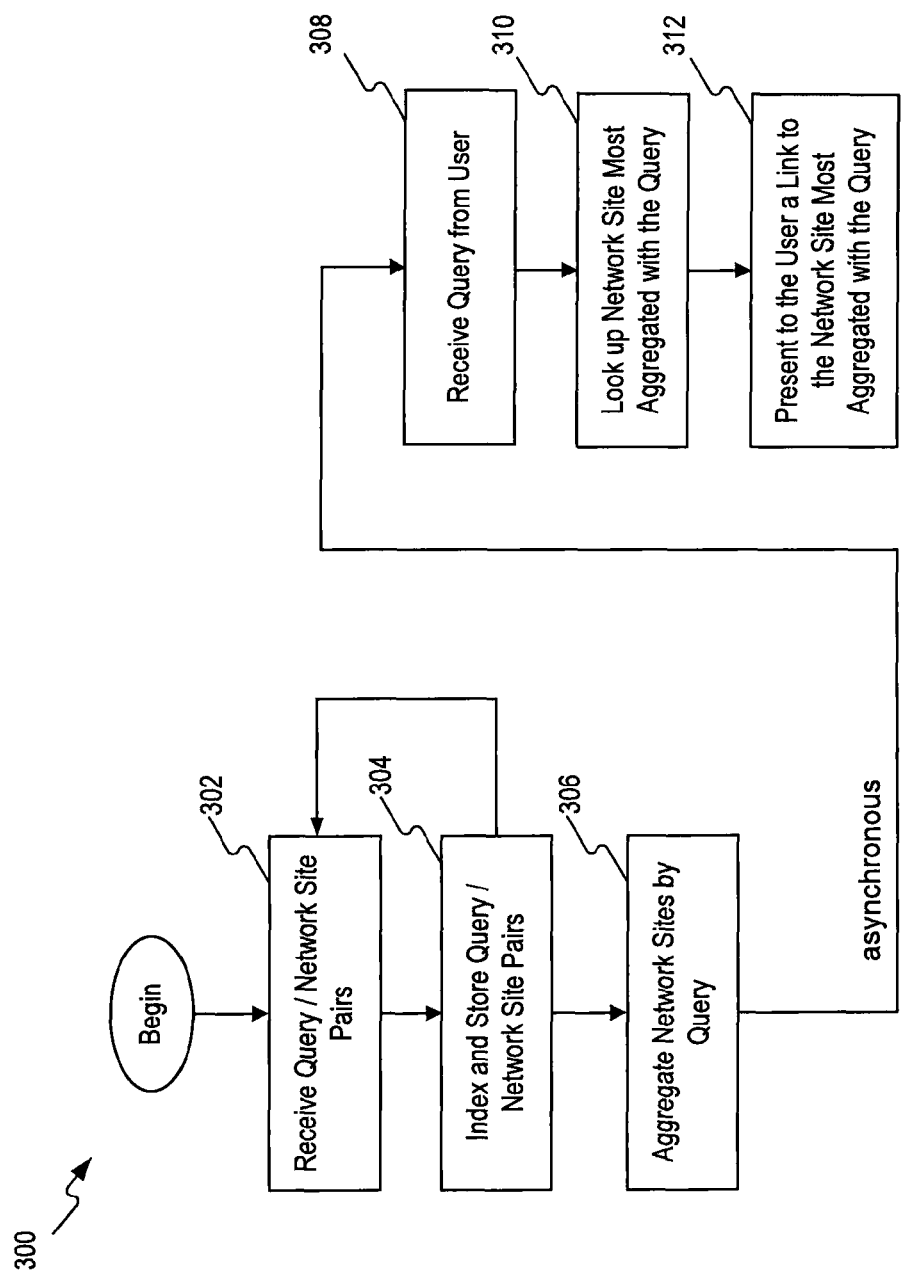
FIG. 3 depicts a flow diagram of an exemplary method for performing search query recirculation.

FIG. 3 depicts a flowchart of an exemplary method 300 for performing query recirculation. Method 300 includes receiving query/network site information, such as query/network site pairs (step 302). For example, method 300 may include receiving referring URL data, including queries, from network site servers 204 and/or external search engines 202. As described above, referring URL data may be collected from beacons 108 running on network sites 106. Network site servers 204 and/or recirculation engine 208 may generate the query/network site pairs using the referring URL data and/or information provided from external search engines 202. Method 300 may further include indexing and storing query/network site pairs (step 304). For example, method 300 may include making query/network site pairs keyword searchable, and storing them in a database. In one embodiment, processor 210 of recirculation engine 208 may parse the query/network site pairs and store the query/network site pairs in memory 212 and/or indexed database 218. Method 300 may further include aggregating network sites by query (step 306). For example, method 300 may include generating a list of queries, along with a list of network sites accessed using each query. Alternatively, or additionally, method 300 may include generating a list of network sites, along with a list of queries used to access each network site. In one embodiment, processor 210 of recirculation engine 208 may aggregate and manipulate queries in relation to the network sites, and store results in indexed database 218. Method 300 may further include additional filtering techniques and/or statistical techniques to generate a table, index, or other structured data format of queries and network sites. Method 300 may continue receiving, indexing, storing, and aggregating query and network site data in a continuous, asynchronous manner.

Method 300 may also include receiving a query from a user (step 308). For example, method 300 may include receiving a query through web servers operating the network search engine 206 via network search engine site 110. Method 300 may also include looking up which network site is most aggregated with the query received from the user (step 310). For example, method 300 may include polling indexed database 218 to determine which network site 106/112 is most relevant to the received query. In one embodiment, processor 210 of recirculation engine 208 may poll indexed database 218 for the network site 106/112 most relevant to the received query. Method 300 may further include displaying to the user a link to the network site that was determined to be most relevant (step 312). For example, web servers executing network search engine 206 may present display results to users over the Internet 201.

Figure 4:
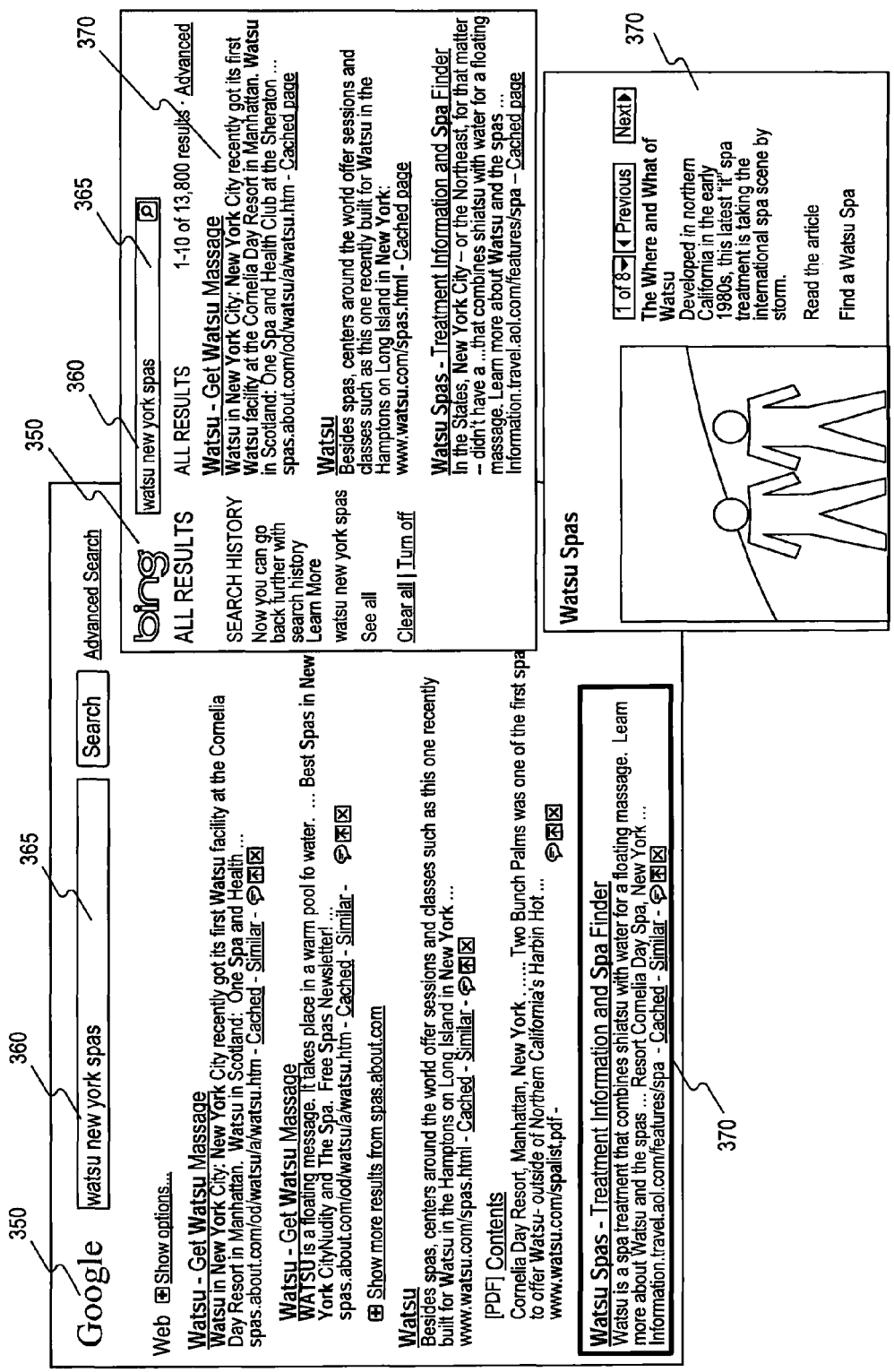
FIG. 4 depicts exemplary results web pages generated by external search engines.

FIG. 4 shows exemplary query page 350 at an external search engine website, where a user may enter a query 360 in a query bar 365. The external search engine may return a plurality of "hits" or links to websites determined by the search algorithm to have content relevant to the entered query. In some embodiments, the search results may include links 370 to network websites (e.g., one of network websites 106/112). As discussed above, when a user clicks on one of the links 370, an operator of the clicked network website may receive a referring URL, which includes the domain of the search engine and the query word(s) entered into the search engine. The referring URL may include any other useful information, such as a timestamp, demographic data, advertising data, etc.

Figure 5:
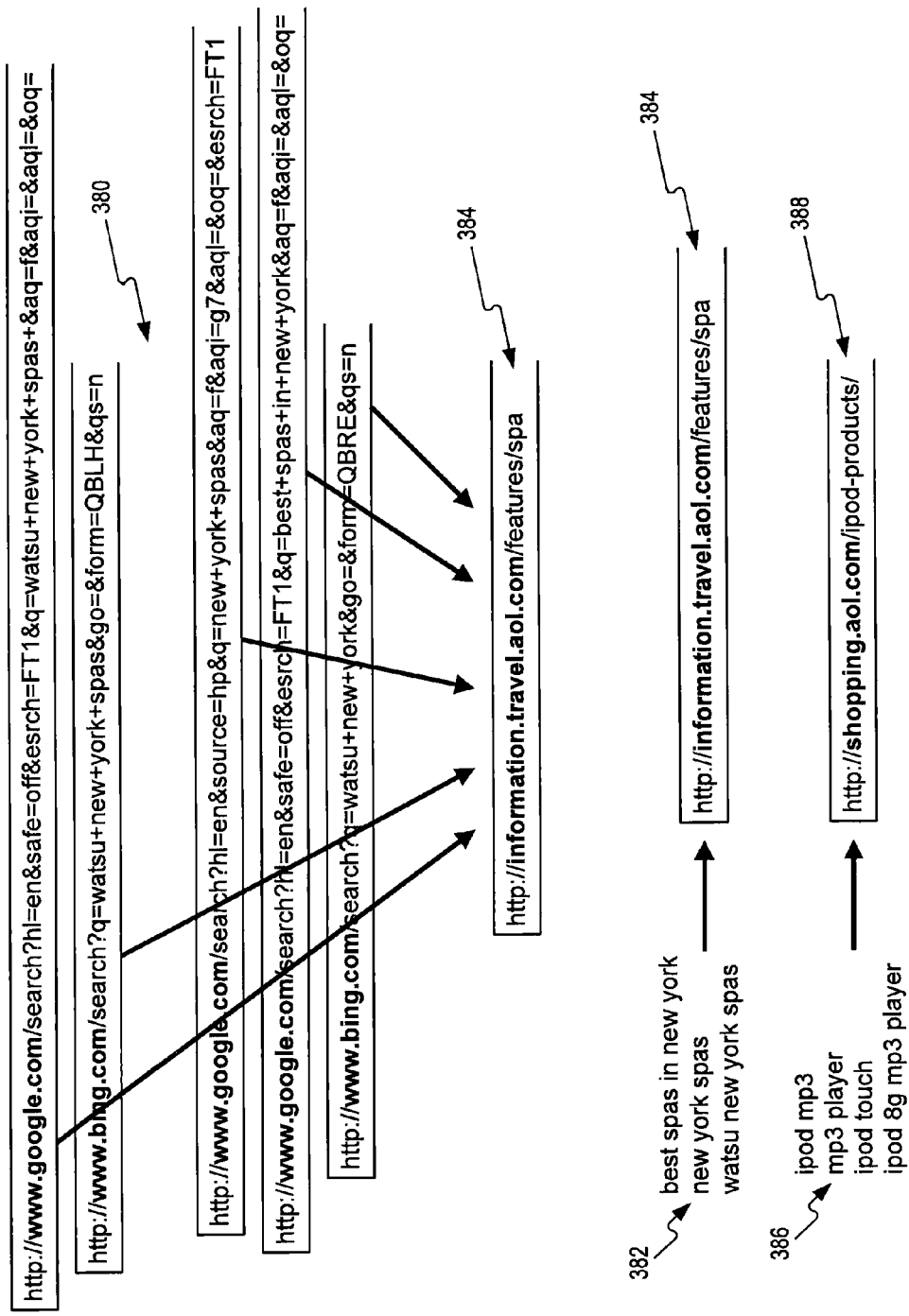
FIG. 5 depicts exemplary referring URLs, and queries associated with network websites.

As shown in FIG. 5, referring URLs 380 may be sent to a network website 384 associated with a particular URL. Thus, as described above, tracking beacons 108 may allow recirculation engine 208 to begin associating queries from the referring URLs in relation to each relevant network website 106/112. For example, sample queries 382, including "best spas in new york," "new york spas," and "watsu new york spas," may be associated with URL 384, which points to a network website associated with a plurality of spas, such as a "Watsu New York Spa". Likewise, sample queries 386, including "ipod mp3," "mp3 player," "ipod touch," and "ipod 8 g mp3 player," may be associated with a URL 388, which points to a network website associated with an iPod MP3 player. As described above, such information may be stored in a structured database, such as a table or index stored in indexed database 218.

The above-referenced systems and methods may allow a network search engine to improve search results by leveraging relationships discovered by external search engines. In particular, the network search engine may receive queries, look up websites that are stored in relation to those queries, and then deliver to users search results that include those network websites that are probably related to the queries. Because the network websites are stored in relation to queries based on search-result click-through data obtained by the network's tracking beacons 108, the network may reduce or even eliminate the amount of crawling and indexing that it performs of its own network sites. In addition, the network may reduce the amount of editorial input that is implemented into delivering search results based on keyword queries. Therefore, the present systems and methods may achieve substantial savings in terms of processing power and man hours.

Figure 6:
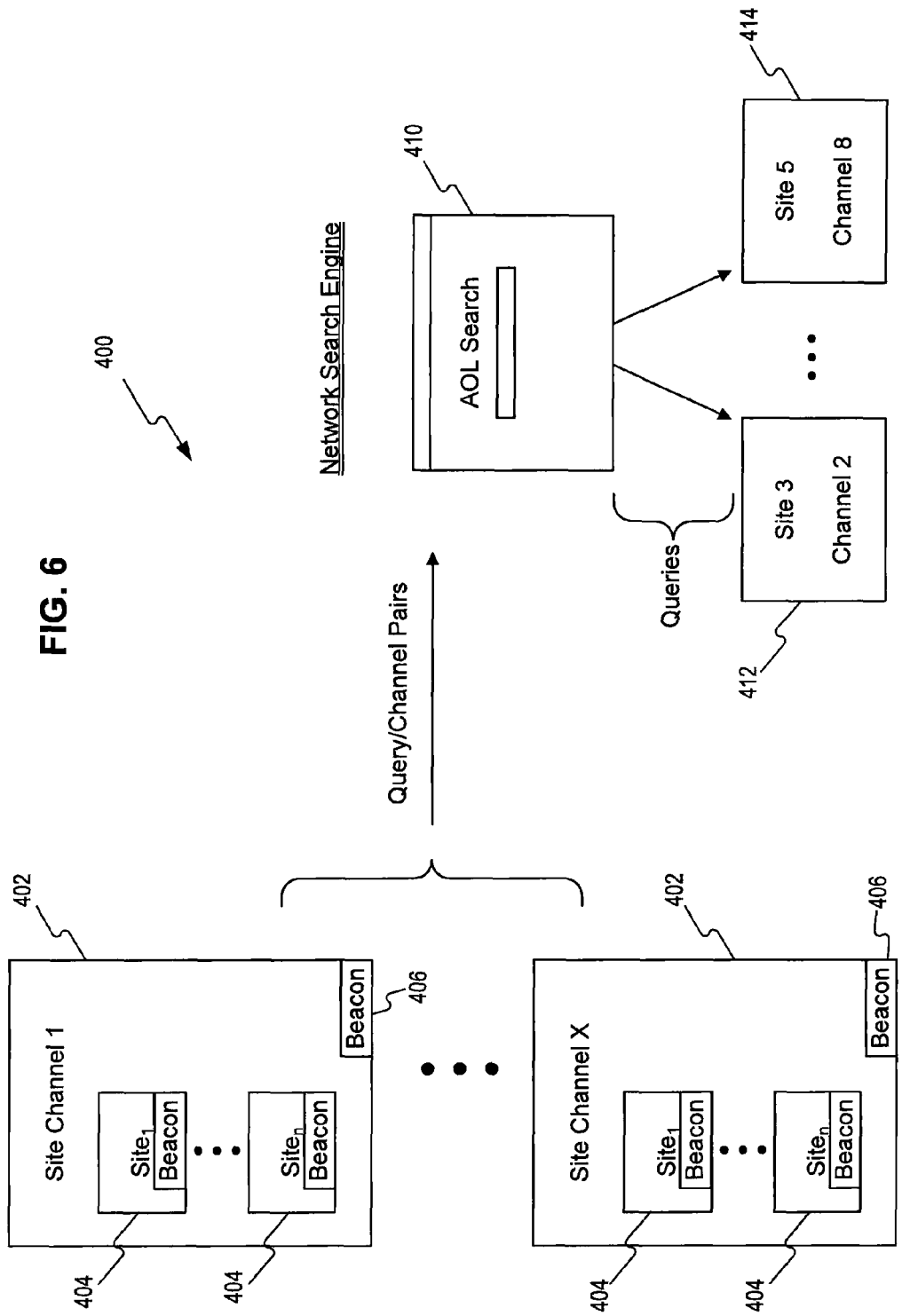
FIG. 6 depicts a block diagram of an exemplary website environment for performing query categorization.

FIG. 6 illustrates another exemplary Internet environment 400 for improving search results on a network search engine 410. In certain embodiments, a network may operate content websites that are divided into "channels" defined by subject matter or content topics. For example, a network may include a plurality of site channels 402, each of which includes a plurality of sites 404 grouped within that channel. For example, a shopping channel may include a plurality of separate sites 404 relating to various types or aspects of shopping (e.g., mens shopping, womens shopping, kids shopping, etc.).

As shown in FIG. 6, the channels 402 may be provided with tracking beacons 406, which may be implemented as tracking beacons distributed across the sites 404 in each channel 402. Alternatively, sites 404 may be provided with their own tracking beacons, but data may be aggregated across sites 404 based on the channel 402 in which each site is categorized. As described above with respect to FIGS. 1 and 2, a query categorization engine (e.g., like recirculation engine 208) may be configured to receive tracking data and/or channel data from the tracking beacons 406. The query categorization engine may have a memory and processor configured to generate query/channel pairs, or otherwise group queries according to which channel they relate to.

In one embodiment, a query may be grouped with a channel if it results in a user clicking on a website in the channel. Additionally or alternatively, a query may be grouped with a channel if it is entered into a search box located on a site in the channel. For example, if a user's query for "iPod" leads to the user clicking on a webpage in the "shopping" channel, then the query categorization engine may learn that iPod is more likely to be relevant to the shopping channel. Alternatively, or additionally, if a user's query for "iPod" is entered in a search box on the "shopping" portal home page, then the query categorization engine may learn that "iPod" is more likely to be relevant to the shopping channel.

In one embodiment, the query categorization engine may employ a semantic model to perform a co-relation of query terms with respect to pages that are clicked by users. Such a co-relation model may be used to determine the "max-log-likelihood" that the query belongs to a given category, based on other terms that were searched in relation to the category. In one embodiment, the query categorization engine may employ one or more of kNN, Naive Bayes, SOM+Max Entropy, SVM, or any other suitable co-relation or classification techniques. In addition, the query categorization engine may employ an N-gram or bi-gram method to extract features from query terms for classification. Thus, the query categorization engine may determine not only relationships between queries and categories/channels, but also relationships between queries and other queries.

The query categorization engine may store relationships between queries and channels in a structured database, such as a table or index. Thus, when a user enters a query into a network search engine 410, the network search engine 410 may ask the query categorization engine which channel the query is most likely related to. For example, the query categorization engine may receive the query from the network search engine 410, look up the query in the structured database, and then determine which channel was viewed most often in relation to the query and/or searched from most often in relation to the query, as described above. In one embodiment, the network search engine 410 may request the top several channels most likely relevant to the query and then present those channels (or websites in those channels) to a user on the search results web page. For example, as shown in FIG. 6, upon receiving queries, network search engine 410 may be more likely to present links to a website 3 on channel 2 (412), or to a website 5 on channel 6 (414), based on the determined relevancy between the queries and channels.

Figure 7:
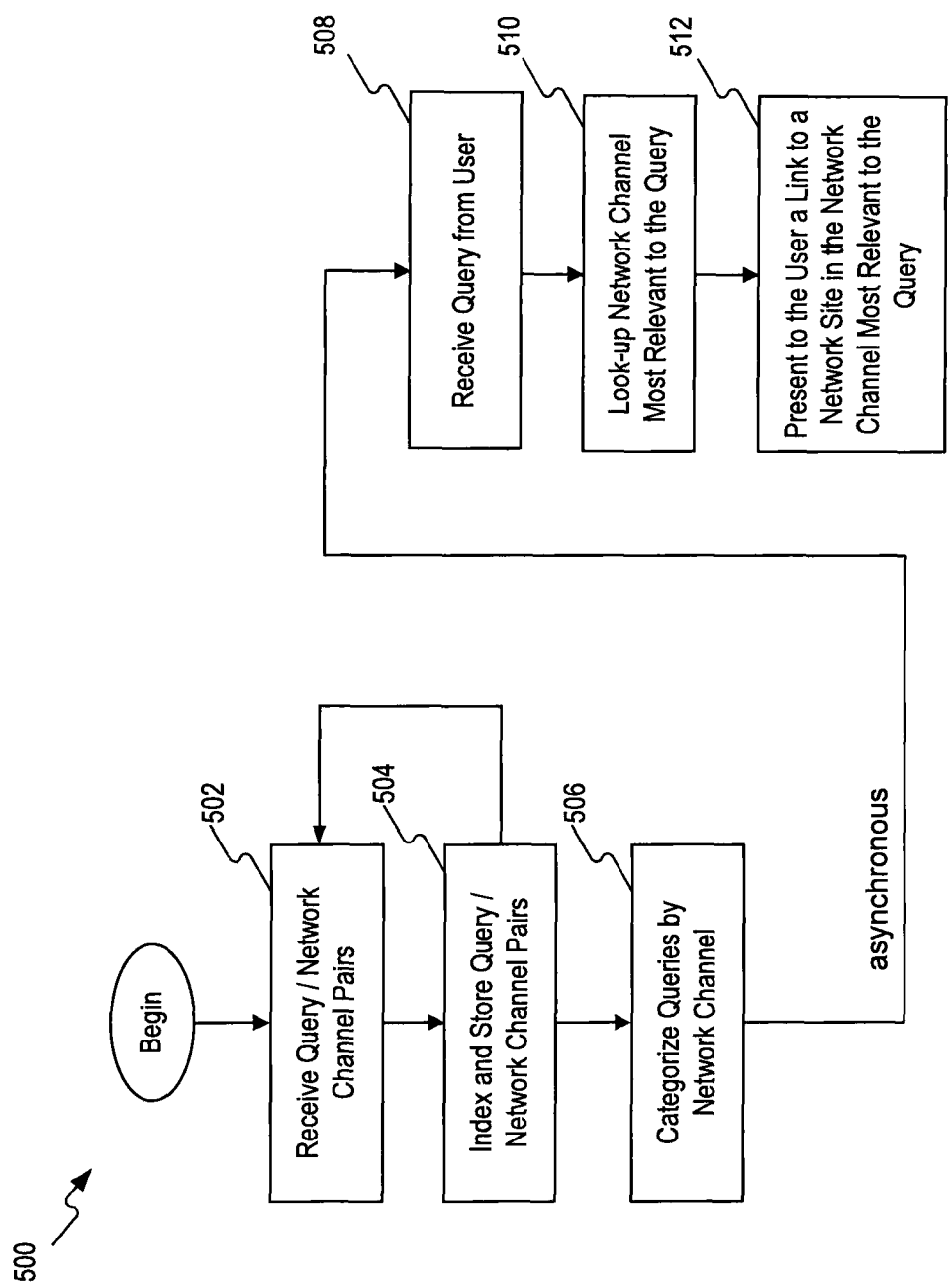
FIG. 7 depicts a flow diagram of an exemplary method for performing query categorization.

FIG. 7 depicts a flowchart of an exemplary method 500 for performing query categorization. Method 500 includes receiving query/network channel information, such as query/network channel pairs (step 502). For example, method 500 may include receiving referring URL data and the channel corresponding to a visited network site. Method 500 may further include indexing and storing query/network channel pairs (step 504). For example, method 500 may include making query/network channel pairs keyword-searchable, and storing them in a database. Method 500 may further include categorizing queries by network channel (step 506). For example, method 500 may include generating a list of queries, along with a list of network channels accessed using each query. Alternatively, or additionally, method 500 may include generating a list of network channels, along with a list of queries used to access such channels. Method 500 may further include additional filtering techniques and/or statistical techniques to generate a table, index, or other structured data format of queries and network channels. Method 500 may continue receiving, indexing, storing, and categorizing query and network channel data in a continuous, asynchronous manner.

Method 500 may also include receiving a query from a user (step 508). For example, method 500 may include receiving a query through web servers operating the network search engine 410. Method 500 may also include looking up which network channel is most aggregated with the query received from the user (step 510). For example, method 500 may include polling an indexed database to determine which network channel is most relevant to the received query (e.g., based on website channels visited after searching the query, and/or channels on which the query was entered in a search box), using any of the classification techniques described above. Method 500 may further include displaying to the user a link to a network site in the network channel determined to be most relevant to the query (step 512).

Figure 8:
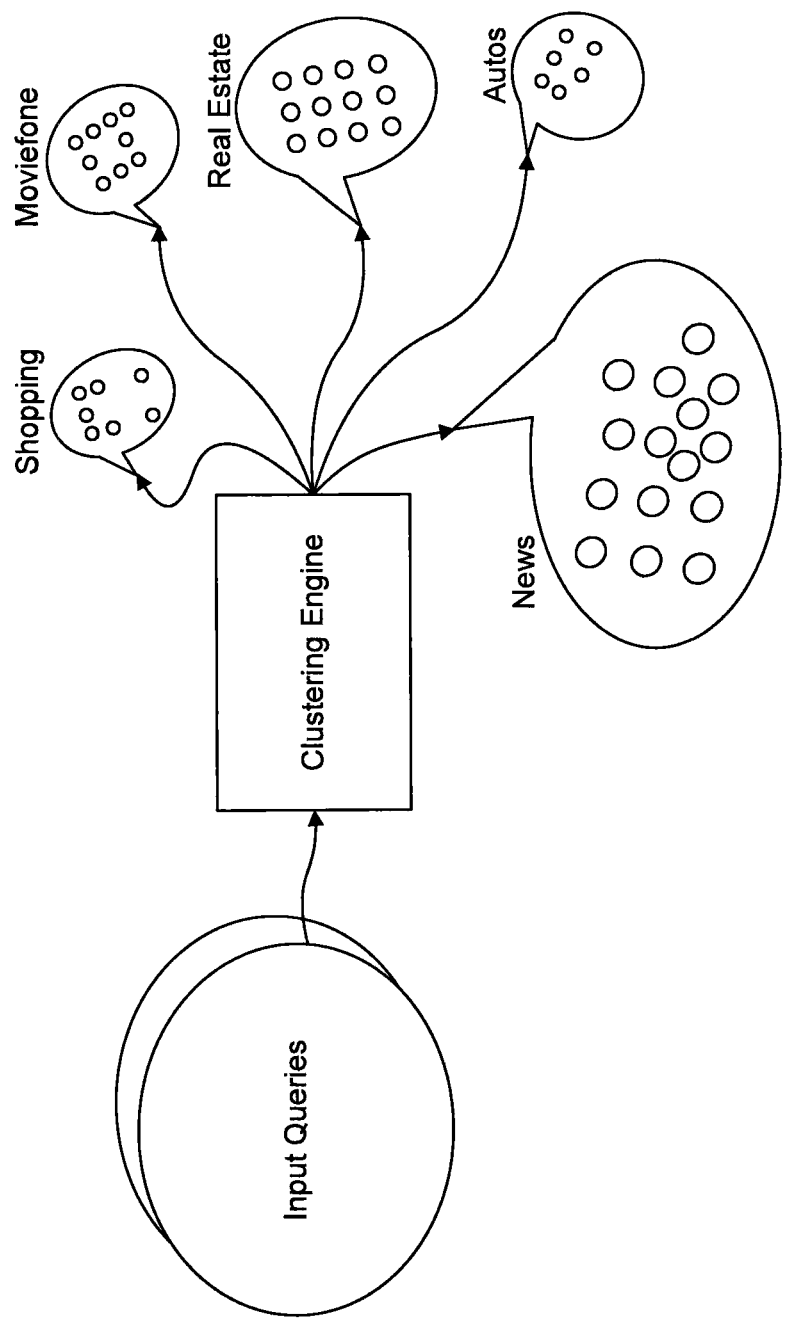
FIG. 8 depicts an illustration of an exemplary query clustering engine.

FIG. 8 is an illustrative view of how method 500 may use the categorization or "clustering" engine described in relation to FIGS. 6 and 7 to turn user input queries into clusters of queries based on topic (e.g., "shopping," "moviefone," "real estate," "autos," "news," etc.). Thus, the presently disclosed systems and methods may allow a network to categorize queries by using tracking beacons on categorized websites. As a result, the network may efficiently determine what types of search results to display to a user, based on a prediction of the relevant topic cluster, without the need for extensive editorial control, processing power, or complex algorithms.

The many features and advantages of the present disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for generating online search results, the method comprising:
receiving, over the Internet, referring URL data including a query and a network site ID for a network site that was visited based on a third party Internet web search engine analysis of the query;
generating, using a processor of a recirculation engine, indexed query and network site data based on the received referring URL data and network site ID;
receiving, over the Internet, a new query from a user for an Internet web search, the new query being received by an Internet web search engine that is different from the third party Internet web search engine;
determining, using a processor of the Internet web search engine, a network site relevant to the new query based on the indexed query and network site data; and
displaying to the user a link to the determined network site.

2. The computer-implemented method of claim 1, wherein generating indexed query and network site data includes storing pairs of queries and network site IDs.

3. The computer-implemented method of claim 1, wherein the referring URL data is generated by a server associated with a third party Internet web search engine.

4. The computer-implemented method of claim 1, wherein the referring URL data is received by a beacon associated with the network site.

5. The computer-implemented method of claim 4, wherein the beacon is a web bug, tracking bug, tracking pixel, or pixel tag.

6. The computer-implemented method of claim 1, wherein the referring URL data further includes one or more of click data, impression data, a referrer log, a referrer URL, user demographic information, and a timestamp.

7. A system for generating online search results, the system comprising:
a recirculation engine including at least one processor configured to perform the following steps:

receiving, over the Internet, referring URL data including a query and a network site ID for a network site that was visited based on a third party Internet web search engine analysis of the query; and generating indexed query and network site data based on the received referring URL data and network site ID; and an Internet web search engine that is different from the third party Internet web search engine and includes at least one processor configured to perform the following steps:

receiving, over the Internet, a new query from a user for an Internet web search;

determining a network site relevant to the new query based on the indexed query and network site data; and displaying to the user a link to the determined network site.

8. The system of claim 7, wherein the at least one processor of the recirculation engine is further configured for generating indexed query and network site data by storing pairs of queries and network site IDs.

9. The system of claim 7, wherein the referring URL data is generated by a server associated with a third party Internet web search engine.

10. The system of claim 7, wherein the referring URL data is received by a beacon associated with the network site.

11. The system of claim 10, wherein the beacon is a web bug, tracking bug, tracking pixel, or pixel tag.

12. The system of claim 7, wherein the referring URL data further includes one or more of click data, impression data, a referrer log, a referrer URL, user demographic information, and a timestamp.

13. A computer-implemented method for generating online search results using categorizing search queries, the method comprising:

receiving, over the Internet, referring URL data including a query and a category of a network site that was visited based on a third party Internet web search engine analysis of the query;

generating, using a processor of a categorization engine, indexed query and category data based on the received referring URL data and category;

receiving, over the Internet, a new query from a user for an Internet web search, the new query being received by an Internet web search engine that is different from the third party Internet web search engine;

determining, using a processor of an Internet web search engine, a network site category relevant to the new query based on the indexed query and category data; and displaying to the user a link to a network site in the network site category.

14. The computer-implemented method of claim 13, wherein generating indexed query and network site data includes storing pairs of queries and network site IDs.

15. The computer-implemented method of claim 13, wherein the referring URL data is generated by a server associated with a third party Internet web search engine.

16. The computer-implemented method of claim 13, wherein the referring URL data is received by a beacon associated with the network site.

17. The computer-implemented method of claim 16, wherein the beacon is a web bug, tracking bug, tracking pixel, or pixel tag.

18. The computer-implemented method of claim 13, wherein the referring URL data further includes one or more of click data, impression data, a referrer log, a referrer URL, user demographic information, and a timestamp.

19. A system for generating online search results using categorizing search queries, the system comprising:

a categorization engine including at least one processor configured to perform the following steps:

receiving, over the Internet, referring URL data including a query and a category of a network site that was visited based on a third party Internet web search engine analysis of the query; and generating indexed query and category data based on the received referring URL data and category; and an Internet web search engine that is different from the third party Internet web search engine and includes at least one processor configured to perform the following steps:

receiving, over the Internet, a new query from a user for an Internet web search;

determining a network site category relevant to the new query based on the indexed query and category data; and displaying to the user a link to a network site in the network site category.

20. The system of claim 19, wherein the at least one processor of the categorization engine is further configured for the generating indexed query and network site data by storing pairs of queries and network site IDs.

21. The system of claim 19, wherein the referring URL data is generated by a server associated with a third party Internet web search engine.

22. The system of claim 19, wherein the referring URL data is received by a beacon associated with the network site.

23. The system of claim 22, wherein the beacon is a web bug, tracking bug, tracking pixel, or pixel tag.

24. The system of claim 19, wherein the referring URL data further includes one or more of click data, impression data, a referrer log, a referrer URL, user demographic information, and a timestamp.

* * * * *